United States Patent [19]

Reese

[11] Patent Number: 5,121,949
[45] Date of Patent: Jun. 16, 1992

[54] COMPRESSION COUPLING

[75] Inventor: Anthony L. Reese, Bradford, Pa.

[73] Assignee: Dresser Industries, Inc., Dallas, Tex.

[21] Appl. No.: 541,445

[22] Filed: Jun. 22, 1990

Related U.S. Application Data

[63] Continuation of Ser. No. 193,436, May 12, 1988, abandoned.

[51] Int. Cl.$^5$ .............................................. F16L 33/22
[52] U.S. Cl. .................................. 285/255; 285/322; 285/334.4
[58] Field of Search ................ 285/32, 110, 248, 249, 285/250, 322, 323, 340, 341, 342, 343, 356, 334.4, 255

[56] References Cited

U.S. PATENT DOCUMENTS

| | | |
|---|---|---|
| 1,743,315 | 1/1930 | Callender . |
| 1,821,862 | 9/1931 | Wilson ...................... 285/334.4 |
| 2,228,018 | 1/1941 | Scholtes ...................... 285/84 |
| 2,339,771 | 1/1944 | Davies ...................... 285/166 |
| 2,343,235 | 2/1944 | Bashark ...................... 285/343 X |
| 2,452,277 | 10/1948 | Woodling ...................... 285/122 |
| 2,470,546 | 5/1949 | Carlson ...................... 285/166 |
| 2,474,319 | 6/1949 | Muller ...................... 285/343 |
| 2,644,700 | 7/1953 | Woodling ...................... 285/122 |
| 3,083,041 | 3/1963 | Owenmark ...................... 285/7 |
| 3,248,135 | 4/1966 | Meripol ...................... 285/323 |
| 3,365,219 | 1/1968 | Nicolaus ...................... 285/340 |
| 3,375,025 | 3/1968 | Engel ...................... 285/15 |
| 3,434,744 | 3/1969 | Yoke ...................... 285/356 X |
| 3,486,775 | 12/1969 | Callahan ...................... 285/356 X |
| 3,498,647 | 3/1970 | Schroder ...................... 285/343 |
| 3,545,794 | 12/1970 | Wise ...................... 285/248 |
| 3,552,781 | 1/1971 | Helland ...................... 285/322 |
| 3,563,575 | 2/1971 | Sanford ...................... 283/323 |
| 3,591,208 | 7/1971 | Nicolaus ...................... 285/250 |
| 3,596,933 | 8/1971 | Luckenbill ...................... 285/94 |
| 3,615,160 | 10/1971 | Feather ...................... 285/250 |
| 3,679,241 | 7/1972 | Hoffmann ...................... 285/340 |
| 3,756,632 | 9/1973 | Riggs et al. ...................... 285/250 |
| 3,814,466 | 6/1974 | Leopold, Jr. ...................... 285/55 |
| 3,843,169 | 10/1974 | Wise . | |
| 3,888,519 | 6/1975 | Smith et al. ...................... 285/55 |

(List continued on next page.)

FOREIGN PATENT DOCUMENTS

| | | |
|---|---|---|
| 1382489 | 3/1965 | France . |
| 605078 | of 1848 | United Kingdom ............... 285/322 |
| 811384 | 4/1959 | United Kingdom . |
| 896359 | 8/1959 | United Kingdom . |
| 914971 | 1/1963 | United Kingdom . |
| 9961233 | 6/1964 | United Kingdom . |
| 1267007 | 7/1970 | United Kingdom . |

OTHER PUBLICATIONS

Brochure entitled "O-Rings: A Definition".

*Primary Examiner*—Dave W. Arola

[57] ABSTRACT

A coupling is provided for joining segments of plastic pipe. The coupling includes a body portion having an inner bore opening to an enlarged outer bore. A metal stiffener tube having a flange at one end is inserted into the bore of the body until the flange contacts an internal stop. An elastomeric gasket having a substantially rectangular cross-sectional area encircles the stiffener. When the coupling is tightened a corner portion of the gasket initially engages a sloped surface in the enlarged outer bore of the body to initially load the gasket for sealing. A rigid washer encircles the stiffener and contacts the outside end of the gasket. A grip ring, comprising a frustoconical radially outer surface, an inner surface with gripping members, a segmented lateral slot, and a resilient lip around one end, encircles the stiffener so that the lip is in contact with the washer. A connecting nut having a frustoconical bore for mating with the outside surface of the grip ring surrounds the stiffener and engages the enlarged bore of the body. The plastic pipe is inserted into the bore and around the stiffener. Tightening of the connecting nut into the enlarged bore causes axial movement and radial compression of the grip ring around the pipe and compression of the gasket by axial force of the nut and the washer. The compressed gasket provides a seal between the bore of the body and the outer surface of the plastic pipe.

3 Claims, 1 Drawing Sheet

U.S. PATENT DOCUMENTS

| | | | |
|---|---|---|---|
| 3,977,704 | 8/1976 | Mever | 285/27 |
| 3,986,731 | 10/1976 | DeHoff | 285/81 |
| 3,989,283 | 11/1976 | Pepper | 285/323 |
| 4,008,911 | 2/1977 | Kiyooka et al. | 285/249 |
| 4,062,572 | 12/1977 | Davis | 285/55 |
| 4,063,760 | 12/1977 | Moreiras | 285/249 X |
| 4,068,866 | 1/1978 | Saha | 285/105 |
| 4,107,452 | 8/1978 | Razvi | 174/84 |
| 4,256,335 | 3/1981 | Nielsen, Jr. | 285/250 |
| 4,335,908 | 6/1982 | Burge | 285/250 |
| 4,371,172 | 2/1983 | de Vienne | 285/343 X |
| 4,422,673 | 12/1983 | Blackford | 285/322 X |
| 4,488,741 | 12/1984 | Conley et al. | 285/250 |
| 4,569,542 | 2/1986 | Anderson et al. | 285/337 |
| 4,621,843 | 11/1986 | Straub | 285/356 |
| 4,637,636 | 1/1987 | Guest | 285/38 |
| 4,712,813 | 12/1987 | Passerell et al. | 285/250 |
| 4,798,404 | 1/1989 | Lyanicki | 285/249 X |
| 4,867,489 | 9/1989 | Patel | 285/342 |

COMPRESSION COUPLING

This application is a continuation of application Ser. No. 07/193,436, field May 12, 1988, now abandoned.

TECHNICAL FIELD

This invention relates to an Improved Compression Coupling for use in connecting a plastic pipe which extends through a first metal pipe to a second metal pipe.

BACKGROUND ART

In natural gas distribution systems requiring replacement of old metal piping, it has been found to be expedient to insert new plastic pipe into the old metal pipe to avoid having to dig up the old pipe. Such a situation occurs, for example, when replacing the section of pipe leading from a main line to a customer meter. Leakage in the old pipe system usually occurs in that section of metal pipe extending through the ground outside of a customer building. Within the building, exposure of plastic pipe is prohibited, so that it becomes necessary to provide a coupling between the plastic tubing inserted into the old pipe and metal distribution piping in the building leading to the meter. System-wide replacement of metal piping with inserted plastic pipe requires substantial standardization of the couplings used in connecting the plastic pipe to the usable metal pipe within the building and requires use of a coupling which has a limited length in order to fit easily within a limited space provided within the building at the point where the old metal pipe enters through the building and elbows upwardly, to the meter. For ease in installation, it is particularly desirable that one end of the coupling be sized to fit within the elbow before it turns upwardly and the other end be sized to thread onto the end of the old metal piping extending from the wall. In this way, the coupling may be merely inserted into the line without having to cut new threads or remove any portion of the old metal piping. However, it would be appreciated that the result of this procedure is to effectively increase the length of the pipe extending from the wall by an amount equal to the length of the coupling less whatever distances are threaded into the elbow and onto the end of the old metal piping. It will be appreciated that this increased length requires that the old metal piping extending upwardly from the elbow to the meter be bent further away from the wall. To avoid undue bending of the upright pipe and the possible introduction of stresses which may cause that pipe to leak, it clearly is desirable for the coupling to be as short as possible.

One prior form of coupling usable to connect a plastic pipe to a metal pipe is disclosed in U.S. Pat. No. 4,062,572. Another form of fitting usable for example in connecting together sections of plastic pipe is disclosed in U.S. Pat. No. 4,878,697 issued on Nov. 7, 1989. Still another form of coupling usable in connecting a plastic pipe to a metal pipe is disclosed in U.S. Pat. No. 3,375,025.

DISCLUSURE OF INVENTION

The present invention aims to provide a new and improved coupling which insures the development of high gasket pressure for effective sealing within normal manufacturing tolerances and at the same time provide a coupling which is of limited overall length for easy use in plastic pipe replacement of old metal piping in a natural gas distribution system. In particular, the invention resides in a novel relationship between the relaxed geometric configuration of a gasket within the coupling and the configuration of an annular seal confining space acting in cooperation with the gripper in the coupling.

The coupling of the present invention includes a body having an inner bore for receiving an end of plastic pipe or conduit. The body includes a sloped transition surface opening from the inner bore to an enlarged outer bore having internal threads for mating with external threads of a connecting nut. A stiffener, such as a metal tube having a flange at one end, is inserted into the bore of the body until the flange contacts a stop in the bore. An elastomeric gasket having a relaxed geometric configuration with a surface dissimilar from the slope of the transition surface is inserted into the bore and first engages the transition surface where the inner bore opens to the enlarged bore. A grip ring having a frustoconical radially outer surface and an inner surface with gripping members is provided for gripping the pipe and for transferring compressive force to the gasket. The grip ring of the present invention is constructed so as not to grip the plastic pipe until tightening of the nut initiates gripping engagement with the pipe. A resilient means, which may comprise a rigid washer in combination with a resilient lip around one end of the grip ring, is disposed between the gasket and the grip ring in the body to apply compressive force against the gasket. The connecting nut has an interior frustoconical bore for mating with the outer surface of the grip ring as the external threads of the nut engage the internal threads of the enlarged bore of the body.

To connect an end of plastic pipe to the coupling, the end of the plastic pipe is inserted through the bore of the nut and into the body of the loosely assembled coupling. The plastic pipe fits around the stiffener and within the inner bore of the body. As the coupling nut is tightened it forces the grip ring axially against the resilient means which applies compressive force to the elastomeric gasket. The grip ring includes a lateral slot along its length so that as tightening progresses the nose of the nut rides over a shoulder of the grip ring to force a first gripping member of the grip ring radially into gripping contact with the plastic pipe. When the nut is fully tightened into the body, the frustoconical bore of the nut compresses the grip ring radially so that the remaining gripping members engage the pipe, and the nose of the nut extends beyond the qrip ring to apply compressive force to the gasket. Compression of the gasket provides a seal between the outer surface of the plastic pipe and the inner surface of the body. The force of the nose of the nut against the washer drives the washer toward the sloped transition surface so that a corner of the gasket first engages the sloped portion of the transition surface and the gasket is initially loaded at substantially point contact with the sloped portion. By virtue of this sloping increase in loading the gasket, normal tolerance variations in the gasket and sealing space volumes are compensated to insure sufficient sealing.

The foregoing and other advantages of the present invention will become more apparent from the following description of the best mode for carrying out the invention when taken in conjunction with the accompanying drawings.

BEST MODE OF CARRYING OUT THE INVENTION

Figure 1:
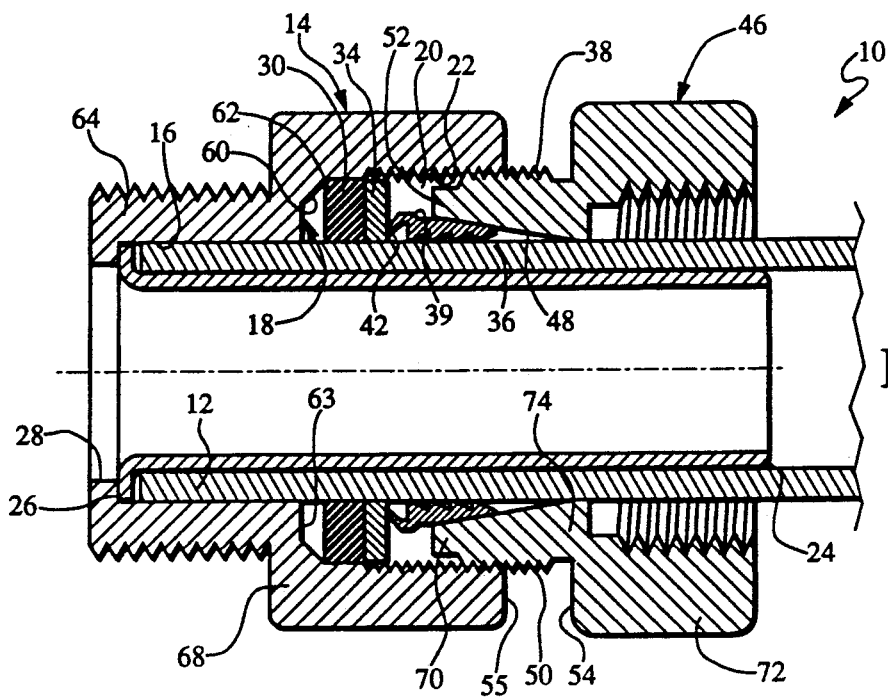
FIG. 1 is a longitudinal cross section of a loosely assembled coupling of the present invention.
Figure 2:
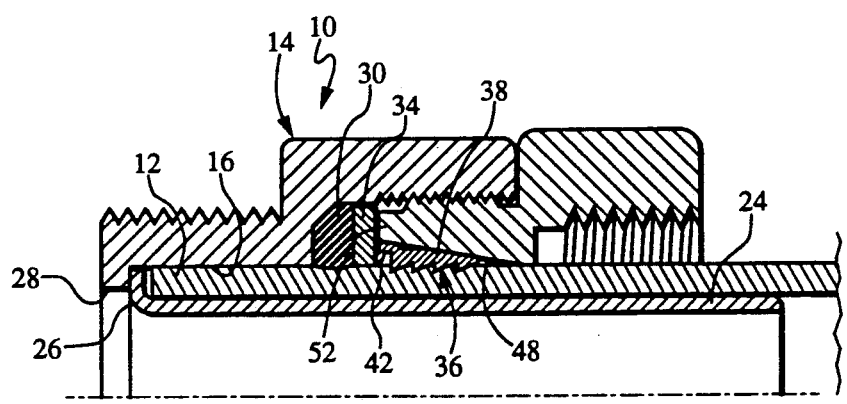
FIG. 2 is a partial longitudinal cross section of the coupling with the connecting nut tightened.

As shown in the drawings for purposes of illustration, the present invention is embodied in a coupling 10 particularly adapted for use in connecting a plastic pipe or conduit 12 as replacement pipe in a natural gas system.

As shown in FIG. 1, coupling 10 includes a body portion 14 having an inner bore 16 and a transition surface 18 opening to an enlarged outer bore 20 having internal threads 22. A stiffener 24, such as a metal tube having a flange 26 at one end, is inserted into bore 16 of body 14 until flange 26 contacts a stop 28 inside body 14. An elastomeric ring or gasket 30 is inserted into body 14 to encircle the stiffener 24. A grip ring 36 having a frustoconical outer surface 38 and an inner surface with a plurality of gripping members 40 is inserted into body 14 so that grip ring 36 encircles stiffener 24. A resilient means, which may comprise a washer 34 and a circumferential resilient lip 42 around one end of grip ring 36, is disposed between gasket 30 and grip ring 36 to apply axial force against gasket 30. Resilient lip 42 may comprise a plurality of segments separated by slots (not shown) to provide the desired resiliency and compressive force against washer 34 to compress gasket 30. Grip ring 36 includes a lateral slot (not shown) that allows grip ring 36 to be compressed radially inward. A connecting nut 46 having a bore with a frustoconical inner surface 48 mates with outer surface 38 of grip ring 36. Connecting nut 46 includes exterior threads 50 for mating with interior threads 22 of body 14 and a stop 54 which abuts the end 55 of body 14 when nut 46 is fully tightened into body 14.

An end of plastic pipe 12 may be connected to coupling 10 when coupling 10 is in the loosely assembled position illustration in FIG. 1. Pipe 12 is simply inserted around stiffener 24 and into bore 16 of body 14. The outer diameter of stiffener 24 is dimensioned to fit inside the inner diameter of pipe 12. In addition, inner bore 16, gasket 30, washer 34, and grip ring 36 are dimensioned to receive pipe 12 between their inner surfaces and stiffener 24. After pipe 12 is inserted into coupling 10, the connection is made secure simply by tightening connecting nut 46 into body 14.

Figure 3:
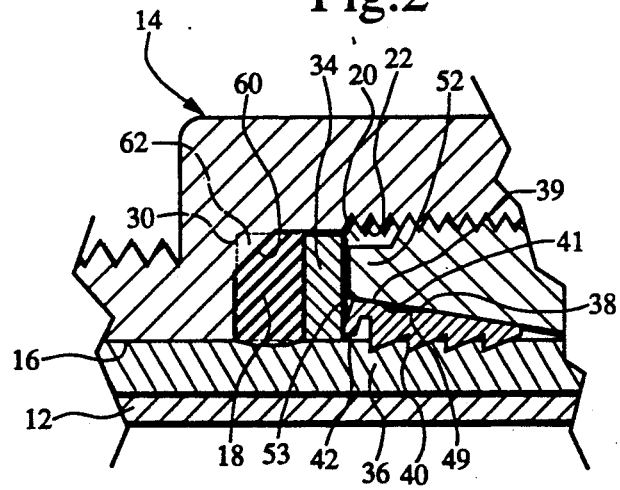
FIG. 3 is an enlarged view showing parts of the coupling in a fully tightened position and the relaxed configuration of the gasket in phantom.

Connecting nut 46 comprises an extension or nose 52 that may include an inner surface 49 (see FIG. 3) having a lesser slope than that of surface 48 and a bevel 53 around its inner rim. Grip ring 36 includes an annular shoulder 39 between lip 42 and surface 38. Annular shoulder 39 includes a ramp 41 rising from surface 38 to shoulder 39 at a slope greater than that of surface 38.

As connecting nut 46 is tightened initially, bevel 53 of nose 52 engages ramp 41 of shoulder 39 to provide axial force to urge grip ring 36 axially toward gasket 30. Nose 52 engages shoulder 39 because of the natural tendency of grip ring 36 to expand radially outward to its relaxed position. As lip 42 contacts the inside diameter of washer 34, the grip ring begins to load the gasket 30 through the washer and further movement of the gripper into the enlarged bore 20 is resisted effectively locating the gripper axially in the bore.

As nut 46 is tightened further, bevel 53 rides up ramp 41 allowing nose 52 to force annular shoulder 39 radially inward and drive a first gripping member 40 into plastic pipe 12. This action by nose 52 on shoulder 39, in conjunction with the action of surface 48 on surface 38, compresses grip ring 36 radially inward so that the plurality of gripping members 40 engage the outer surface of pipe 12.

Connecting nut 46 may be tightened until stop 54 abuts the end 55 of body 14. In the fully tightened position of nut 46, pipe 12 is engaged by gripping members 40 of grip ring 36 while lip 42 and washer 34 apply compression force to gasket 30. The compression of gasket 30 by nose 52, lip 42, and washer 34 provides a seal between the surfaces of bores 16, 18, and 20 of body 14 and the outer surface of pipe 12.

In accordance with the primary aim of the present invention, the coupling 10 includes a uniquely defined seal confining space acting in cooperation with the gasket 30 as the coupling is made to provide a particularly effective seal against the pipe within a minimal coupling length. For these purposes, an annular seal confining space within the body 14 includes one end wall having a sloped portion 60 facing the pipe 12 and the gasket 30 is provided with a corner portion 62 of a geometrical configuration substantially dissimilar from the geometrical configuration of the seal confining space adjacent the sloped portion 60. Preferably, the sloped portion 60 is included in the transition surface 18 to both enhance coaction with the gasket during sealing and provide material at a location within the body allowing construction of a minimal length body 14. Thus, with this arrangement, in-service installation of the coupling is made easier and safer, allowing the coupling to be installed in a building in the limited space between the end of the old gas pipe coming out of the wall and ar elbow to a meter above without excessive bending of the section of pipe leading from the elbow to the meter.

In the present instance, the body 14 includes a male end portion 64, a female end portion 66, and an intermediate portion 68. The latter extends in a substantially radial direction to join the male and female end portions together, and includes the transition surface 18. As shown in FIG. 1, in addition to the sloped portion 62, the surface 18 includes a substantially radially extending portion 63 joining the inner bore 16 to the sloped portion 62 at a point located radially outward of the pipe a selected distance less than the outside diameter of the gasket in a relaxed condition. The point also is located radially inward of the root diameter of the threads on the male end portion so that the minimum thickness of the intermediate portion generally approaches being at least as thick as the minimum thickness of the material existing in the male and female portions of the body. Similarly, the connecting nut 46 includes a male end section 70, an internally threaded female end section 72 and an intermediate section 74 extending in a substantially radial direction and joining the male and female sections together. Herein, the thickness of the material in the intermediate section 74 generally approaches the minimum thickness of the material in the other sections 70 and 72 of the nut.

In tightening the nut 46, in the body 14, it will be appreciated that force is applied by the nose 52, compressed lip 42, and washer 34 on gasket 30. Preferably, the washer is of a rigid construction and during tightening pushes against the gasket 30, driving the corner portion 62 of the gasket into the slope portion 60 to initially point load the gasket. This loading, of course, increases until bottoming out of the nut by engagement of the stop 54 with the end 55 of body 14. The magnitude and general diagonal direction of the loading may be appreciated from FIG. 3 wherein the relaxed size of the gasket 30 is shown by dashed lines in relation to the final geometrical configuration of the annular seal confining space. Preferably, the relative dimensioning of the space and gasket 30 such that, taking into consideration the stacking of tolerances, the volume of the gasket in a relaxed condition is at least not substantially less that the maximum volume of the space and at most is not substantially greater the annular volume of the space so as to avoid causing a greater than a ten percent (10%) reduction in the nominal thickness of the pipe 12. Under these conditions and by virtue of the dissimilarity in the geometrical configuration of the space and gasket, the force applied by nose 52, compressed lip 42, and washer 34 on gasket 30 maintains sufficient compressive loading of gasket 30 to compensate for dimensional variations due to component and pipe tolerances and for axial movement of grip ring 36 away from gasket 30 due to partial pull-out or stretch of pipe 12. Thus, compression of gasket 30 is provided by the combined force of nose 52, compressed lip 42, and washer 34 on gasket 30. In particular, washer 34 maintains loading on gasket 30 even if grip ring 36 is pulled slightly away from gasket 30 by axial stress on pipe 12.

Whereas the present invention has been described with respect to a specific embodiment thereof, various changes and modifications may be suggested to one skilled in the art, and it is intended that the present invention encompass such changes and modifications as fall within the scope of the appended claims.

The embodiments of the invention in which an exclusive property or privilege is claimed are defined as follows:

1. A coupling for a plastic pipe, comprising:
   a body having an enlarged bore narrowing to an inner bore, said bores extending along a longitudinal axis of said body;
   a rigid stiffener tube having a flange at one end thereof with said flange end inserted into said inner bore;
   an elastomeric gasket encircling said stiffener and compressible in said body;
   a grip ring encircling said stiffener and having a frustoconical radially outward surface and a radially inward gripping surface;
   a resilient means for applying axial force against said gasket, said resilient means encircling said stiffener between said grip ring and said gasket;
   a connecting nut encircling said stiffener for engagement with said enlarged bore, said nut having an axially extending nose and a frustoconical bore for mating with said outward surface of said grip ring, wherein insertion of said pipe in said bores and around said stiffener and axial movement of said nut into said body causes axial movement and radial compression of said grip ring around said pipe and compression of said gasket by axial force of said none and said grip ring against said resilient means, said body including a sloped transitions surface between said enlarged bore and said inner bore, said gasket having a relaxed geometric configuration with a surface dissimilar to the slope of said transition surface for first engaging said transition surface to initiate point loading of said gasket upon axial movement of said nut into said body, and wherein said transition surface provides strength to said body allowing for said body to be of minimal length.

2. A compression coupling for plastic pipe, comprising in combination:
   a body having an enlarged bore and a sloped transition surface narrowing to an inner bore, said bores extending along a longitudinal axis of said body and said enlarged bore having internal threads;
   a rigid stiffener tube having a flange at one end thereof with said flange end inserted into said inner bore;
   an elastomeric gasket encircling said stiffener and compressible in said body, said gasket having a geometric configuration with a surface dissimilar to the slope of said transition surface for providing an initial point loading;
   a substantially rigid washer encircling said stiffener for contacting said gasket at its axially outer end;
   a grip ring encircling said stiffener and having a frustoconical radially outward surface, a radially inward surface having a plurality of inwardly projecting means for gripping, and a resilient lip for axially compressive contact with said rigid washer; and
   a connecting nut encircling said stiffener and having external threads for engagement with said internal threads of said enlarged bore, said nut having an axially extending nose and a frustoconical bore for mating with said outward surface of said grip ring, wherein insertion of said pipe in said bores and around said stiffener and axial movement of said nut into said body cause axial movement and radial compression of said grip ring around said pipe and said dissimilar surface of said gasket to first engage said transition surface to initiate loading of said gasket by axial force of said nose and said resilient lip against said washer, and wherein said transition surface provides strength to said body allowing for said body to be of a minimal length.

3. A compression coupling for connecting a segment of plastic, gas pipe telescoped through a first segment of metal pipe to a second segment of metal pipe comprising;
   a body having an externally threaded male end portion, an internally threaded female end portion, and an intermediate portion extending in a substantially radial direction to join said male and female end portions together, the threads in said male and female end portions being of a substantially similar size, sad body further having an enlarged bore extending through said female end portion, a narrower inner bore extending through said male end portion, and said intermediate portion including an inner wall having a first portion extending in a substantially radial direction outwardly from the plastic pipe and a second sloped portion beginning at a selected distance spaced radially outward form said pipe and terminating at said enlarged bore thereby providing a transition surface between said enlarged and inner bores, said male, female, and intermediate body portions having generally similar minimum thickness;
   a connecting nut having an externally threaded male end section, an internally threaded female end section, the threads in said male and female end sections being of a substantially similar size, and an intermediate section extending in a substantial, radial direction and joining said male and female sections together, said male, female and intermediate sections having generally similar minimum thicknesses, said nut having an enlarged bore defining said female end section and a frustoconical bore defining said male end section;

a rigid stiffener tube having a flange at one end thereof, said tube extending within the plastic pipe through said bores in said body and said nut;

a grip ring encircling said stiffener and having a frustoconical outward surface, a radially inward gripping surface, and a resilient lip for axially compressive contact with a substantially rigid washer;

said rigid washer encircling said stiffener within said enlarged bore of said body and defining therein an annular seal confining space extending radially outward of the pipe with one end of said space defined by said inner wall of said intermediate portion, the other end of said space defined by a substantially radial inner face of said washer and the inner and outer diameters of said space being defined between the pipe and enlarged bore, respectively; and a compressible elastomeric gasket encircling said stiffener and having a relaxed outer diameter slightly less than the diameter of said enlarged bore of said female end portion; and a relaxed inner diameter slightly greater than the outside diameter of the plastic pipe; said gasket having a geometrical configuration substantially dissimilar from the geometrical configuration of said seal confining space and including an initially compressible corner segment for providing an initial point loading, said segment initially loaded by engagement with said sloped portion of said inner wall as said nut is threaded into said body to load said seal initially within said space in a direction normal to the face of said sloped portion of said inner wall, and wherein said transition surface provides strength to said body allowing for said body to be of a minimal length.

* * * * *